United States Patent [19]

Nakano et al.

[11] Patent Number: 4,496,893

[45] Date of Patent: Jan. 29, 1985

[54] CONTROLLING DEVICE FOR A BRUSHLESS MOTOR

[75] Inventors: Teruo Nakano, Hachioji; Akio Hirata, Fuchu, both of Japan

[73] Assignee: Tokyo Shibaura Denki Kabushiki Kaisha, Kawasaki, Japan

[21] Appl. No.: 568,514

[22] Filed: Jan. 9, 1984

Related U.S. Application Data

[63] Continuation of Ser. No. 333,161, Dec. 21, 1981, abandoned, which is a continuation of Ser. No. 120,126, Feb. 11, 1980, abandoned.

[51] Int. Cl.³ .............................................. H02P 5/40
[52] U.S. Cl. .................................... 318/721; 318/715; 318/723
[58] Field of Search ............................... 318/715–717, 318/719–724, 798–803, 805, 809

[56] References Cited

U.S. PATENT DOCUMENTS

| 3,684,935 | 8/1972 | Sawyer et al. | 318/800 |
|---|---|---|---|
| 3,689,813 | 9/1972 | Sawyer et al. | 318/800 |
| 3,781,615 | 12/1973 | Mokrytzki et al. | 318/801 |
| 3,876,923 | 4/1975 | Humphrey | 318/809 X |
| 3,894,277 | 7/1975 | Tachibana et al. | 318/721 X |
| 4,088,932 | 5/1978 | Okuyama et al. | 318/721 X |
| 4,125,796 | 11/1978 | Nagase et al. | 318/721 |
| 4,309,643 | 1/1982 | Akamatsu | 318/715 X |
| 4,327,314 | 4/1982 | Hosokawa | 318/722 |
| 4,392,099 | 7/1983 | Kuniyoshi | 318/803 X |

FOREIGN PATENT DOCUMENTS

| 2821314 | 11/1978 | Fed. Rep. of Germany | 318/801 |
|---|---|---|---|
| 46-20621 | 6/1971 | Japan | 318/716 |
| 52-39112 | 3/1977 | Japan | 318/716 |

Primary Examiner—B. Dobeck
Assistant Examiner—Patrick C. Keane
Attorney, Agent, or Firm—Oblon, Fisher, Spivak, McClelland & Maier

[57] ABSTRACT

A synchronous motor is driven by a plurality of inverting circuits. The inverting circuits are controlled by signals from a position detecting circuit coupled to the shaft of the synchronous motor so as to produce output current signals from the inverting circuits which are shifted by a certain angle from each other.

4 Claims, 4 Drawing Figures

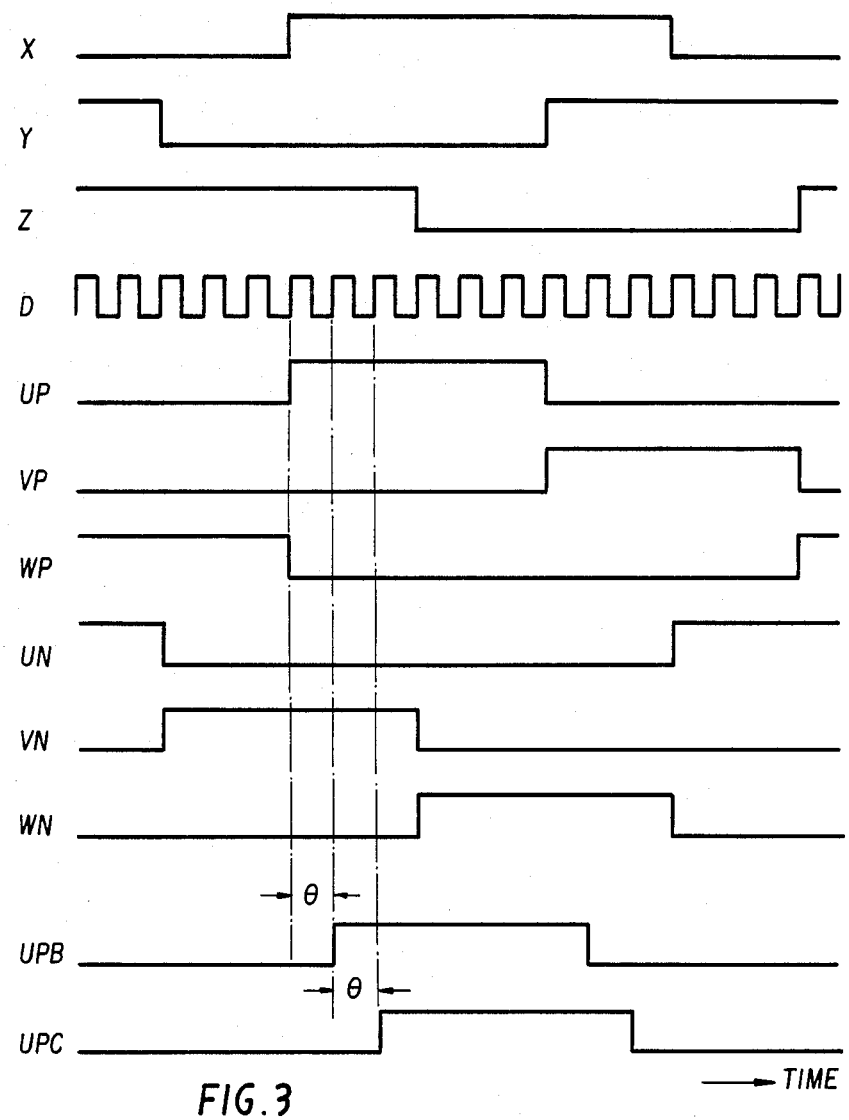
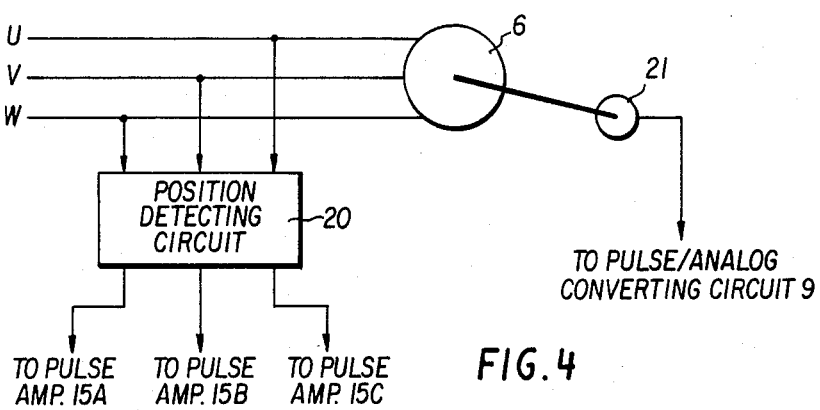
FIG. 3
FIG. 4

CONTROLLING DEVICE FOR A BRUSHLESS MOTOR

This is continuation of application 331,161, filed Dec. 21, 1981, abandoned, which is a continuation of application Ser. No. 120,126, filed Feb. 11, 1980, now abandoned.

BACKGROUND OF THE INVENTION

1. Field of the Invention

This invention generally relates to a controlling device for a brushless synchronous motor which supplies a staircase current waveform having a low high harmonic frequency component to the synchronous motor from a plurality of unit converting devices, which are capable of being phase-controlled.

2. Description of the Prior Art

In the past, two typical systems have been employed as driving systems for a synchronous motor. In one system a current having approximately a sine waveform, which is generated by a sine wave cycloconverter, is supplied to the synchronous motor, whereby the motor is operated with little torque ripple. This system is used with relatively large capacity motors.

On the other hand, in the other system a rectangular current, which is generated by an inverter or a rectangular cyclo-converter, is supplied to the synchronous motor whereby the motor is operated within a broad frequency range. This system is used with relatively small capacity motors.

The former system is advantageous in that it is possible to smoothly operate the synchronous motor with little torque ripple because the current waveform approximates a sine wave. However, the frequency range of operation is narrow and as a result it is difficult to operate the motor at half of the frequency of the power source or lower.

On the other hand, the latter system has an advantage in that it is possible to operate the motor over a wide frequency range. However with this system the higher harmonic components in the current waveform are increased because the current waveform has a rectangular shape. As a result, smooth operation of the motor at low speeds is difficult due to the generation of torque ripple in the motor.

SUMMARY OF THE INVENTION

Accordingly, it is one object of this invention to provide a new and improved controlling device for a brushless motor which reduces the torque ripple and which is capable of operating over a wide frequency range.

Briefly, in accordance with one aspect of this invention, a controlling device for a brushless motor is provided which includes a synchronous motor, the input of which is coupled to a plurality of unit converting devices which are capable of being phase-controlled. The rotational position of the rotor of the motor is detected by a detecting device which produces a signal from which a plurality of pulse signals are derived. The pulse signals are utilized to control the unit converting devices.

BRIEF DESCRIPTION OF THE DRAWINGS

A more complete appreciation of this invention and many of the attendant advantages thereof will be readily obtained as the same becomes better understood by reference to the following detailed description when considered in connection with the accompanying drawings, wherein:

FIGS. 2 and 3 are time charts illustrating the operation of the embodiment shown in FIG. 1; and FIG. 4 is a circuit diagram showing a modification of the embodiment shown in FIG. 1 according to the present invention.

DESCRIPTION OF THE PREFERRED EMBODIMENTS

Figure 1:
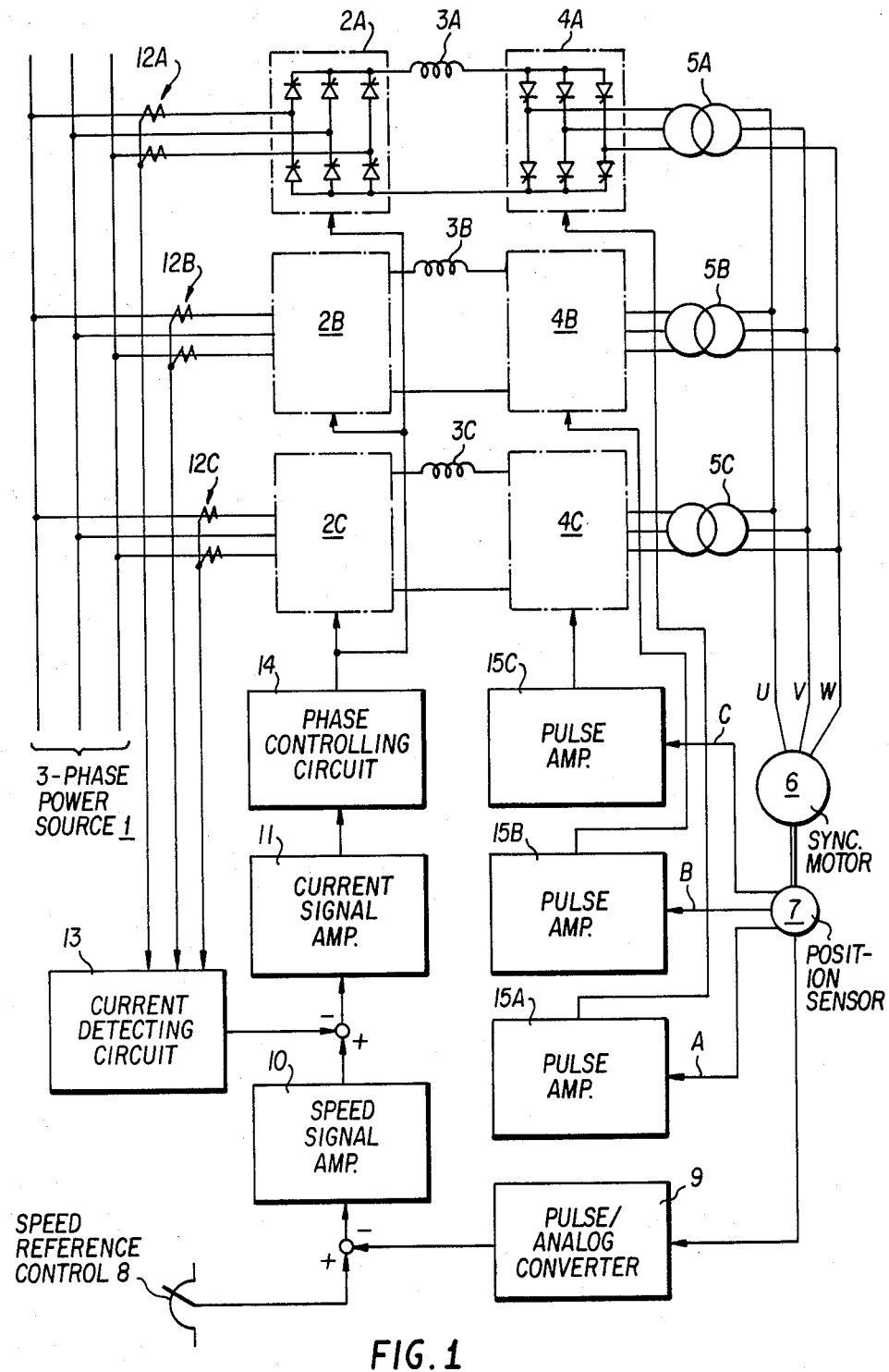
FIG. 1 is a circuit diagram of one preferred embodiment of the controlling device for a brushless motor according to the present invention.

Referring now to the drawings wherein like reference numerals and letters designate identical or corresponding parts throughout the several views, and more particularly to FIG. 1 thereof, wherein one preferred embodiment of the controlling device for a brushless motor device in accordance with the present invention is shown as including three unit converting devices which are connected to a power source 1 and which comprise rectifying circuits 2A, 2B and 2C; smoothing reactors 3A, 3B, and 3C; and converting circuits 4A, 4B and 4C.

Namely in each unit converting device the AC electric power from the power source 1 is rectified by the rectifying circuit 2 and, after smoothing by the smoothing reactor 3, the smoothed electric power is supplied to the inverting circuit 4. Each inverting circuit produces three phase current pulses, each having a 120° conduction angle, which are supplied to a synchronous motor 6 through respective isolation transformers 5A, 5B and 5C.

A position detecting circuit 7, which is coupled to the shaft of the synchronous motor 6, detects the mechanical angular position of the rotor of synchronous motor 6. It should be understood that several methods are available for the angular position sensing or detecting system. The most commonly used methods are Hall effect sensors, electro-optical sensors, and radio-frequency (RF) sensors.

A speed reference signal from a speed reference control 8 and an actual speed signal, as a negative feedback signal, from the position detecting circuit 7 through a pulse/analogue converting circuit 9, are supplied to a speed signal amplifier 10 which produces a signal as a current reference signal. The signal from the speed signal amplifier 10 is supplied to a current signal amplifier 11. At the same time, the input currents of each rectifying circuit 2A, 2B and 2C, detected by respective current transformers 12A, 12B and 12C, are supplied to the current signal amplifier 11 through a current detecting circuit 13 as a negative feedback current signal.

The output signal of the current signal amplifier 11 is supplied to a phase controlling circuit 14 which produces gate pulses to be supplied to the respective gate of the rectifying circuits 2A, 2B and 2C. Thus, it is possible to vary the torque of the synchronous motor 6 by controlling the firing angle of the controllable semiconductor switching elements, for example a plurality of thyristors, of the rectifying circuits 2A, 2B and 2C.

On the other hand, it should be understood that the frequency of the synchronous motor 6 is varied by controlling the firing angle of the controllable semiconducting switching elements, for example a plurality of thyristors, of the inverting circuits 4A, 4B and 4C, in accordance with the output signal from the position detecting circuit 7 through the respective pulse amplifiers 15A, 15B and 15C.

Figure 2:
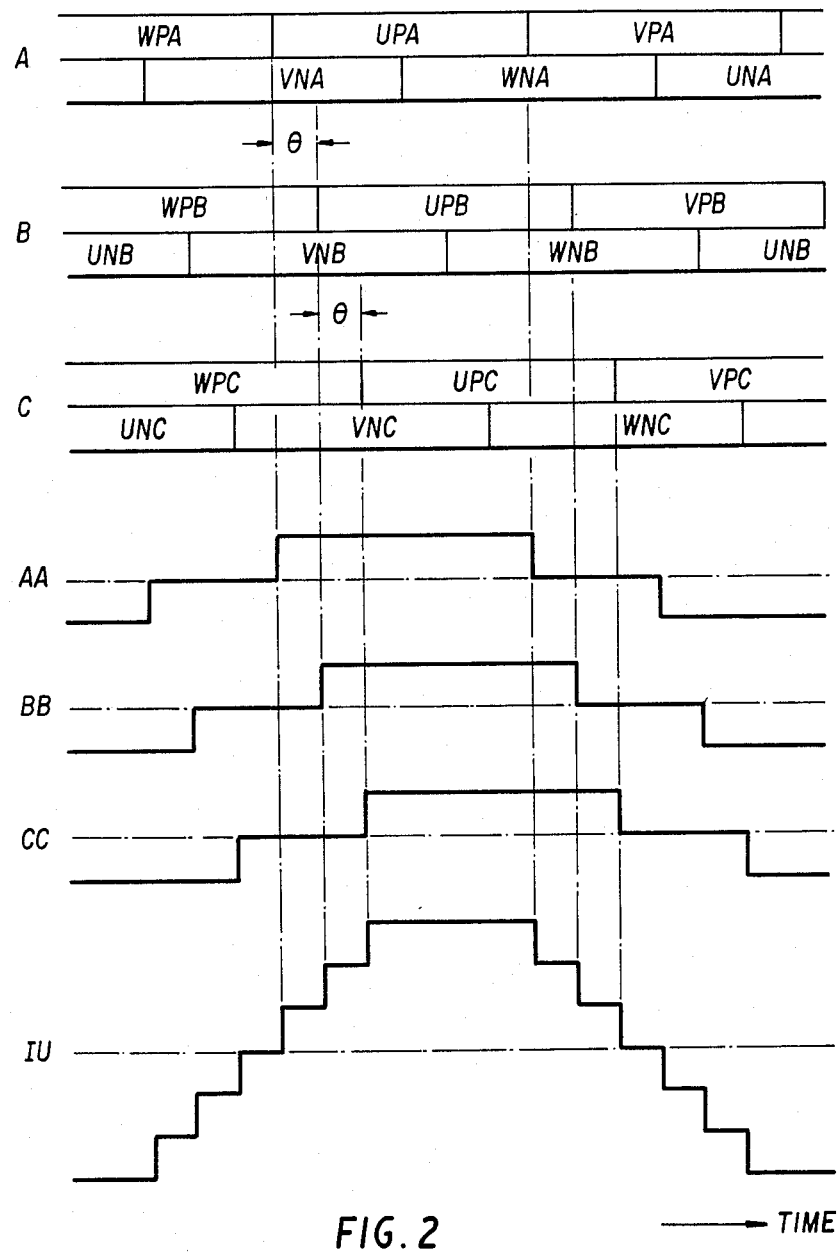

It should now be understood that in accordance with the teachings of the present invention, each output signal from the position detecting circuit 7 is shifted by an angle from the other signals as shown in FIG. 2.

In FIG. 2, A, B and C illustrate the output signals of the position sensor portion of the position detecting circuit 7 as shown in FIG. 1. The current signals AA, BB and CC, which are shifted by an angle $\theta$ with respect to each other, are the respective U-phase current outputs of the inverting circuits 4A, 4B and 4C. These outputs are combined to produce the staircase current input signal IU for the U-phase of the synchronous motor as shown in FIG. 2.

Thus, by supplying to the synchronous motor 6 the current synchronized from the output currents AA, BB and CC of the inverting circuits 4A, 4B and 4C, in accordance with the output signal of the position detecting circuit 7, the input current to the synchronous motor 6 approximates a sine wave form. Thus the higher frequency components in the current waveform can be reduced. and the torque ripple of the synchronous motor 6 can be reduced.

Moreover, it is possible to prevent the generation of mechanical resonances between the synchronous motor 6 and its supporting structure, having a characteristic vibration frequency, because of the high frequency of the torque ripple.

Thus, although this invention has been explained by way of example with the employment of a three stage unit converting device incorporating three inverting circuits, it should be apparent that if desired a two-stage type unit converting device, a four-stage type unit converting device, or a larger unit could be constituted by selecting a different position detecting circuit 7.

Moreover, although it is conceptually simple to use a position detecting circuit which produces the signals UPA through WNA, UPB through WNB, and UPC through WNC in accordance with the rotating position of the synchronous motor, in practice there are a large number of signal and wiring lines required and thus the actual constitution of the position detecting circuit becomes very complicated.

Accordingly, one example of a more practical position detecting circuit is explained with reference to FIG. 3. That is to say, a position detecting circuit of a type previously described which produces four signals X, Y, Z and D. The signals X, Y, Z and D represent the rotational position of the rotor of the synchronous motor. The frequency of the position signal D is higher than that of signals X, Y and Z. By obtaining four signals from the position detecting circuit, it is possible to obtain firing signals for six phases. That is to say, it is possible to obtain the following firing signals by logical calculation: $UP = X \cdot \overline{Y}$, $VP = Y \cdot \overline{Z}$, $WP = Z \cdot \overline{X}$, $UN = \overline{X} \cdot Y$, $VN = \overline{Y} \cdot Z$ and $WN = \overline{Z} \cdot X$.

Furthermore, it is possible to obtain the signals UPB through WNB by shifting the six-phase signals UP through WN by a certain angle $\theta$ and to obtain the signals UPC through WNC by shifting the signals UPB through WNB by a certain angle $\theta$ through the use of the high frequency position signal D. The signals UPB and UPC are illustrated in FIG. 3.

Although the period of the high frequency position signal D is illustrated in FIG. 3 as being equal to the angle $\theta$, if a position signal having a higher frequency is generated, it is possible to make use of a multiple stage type unit converting device in order to produce a fine staircase waveform.

In the case of the two stage type or the three stage type unit converting devices, it is possible to produce a firing signal for each gate signal of the unit converting device by stepping down the high frequency position signal D.

Referring now to FIG. 4, an electrical position detecting circuit 20 is explained as a modification of the present invention. The electrical position detecting circuit 20 is connected to the terminals of the synchronous motor 6 to detect the phase angle of the induced electromotive force. A tachometer 21 is mechanically coupled to the rotor of motor 6 to generate a speed signal which is supplied to the pulse/analog converting circuit 9.

Thus, it is possible to obtain the same position signal as with the above-described mechanical position detecting circuit 7 by utilizing the phase angle of the induced electromotive force. Accordingly, the output signals of the electrical position detecting circuit 20 are supplied to the respective pulse amplifiers 15A, 15B and 15C.

It should now be apparent, in accordance with the teachings of the present invention, that by shifting the phase of output current of a plurality of the inverting circuits by a certain angle in response to the signal of the position detecting circuit it is possible to supply a staircase current waveform, which approximates a sine waveform, to the synchronous motor whereby the synchronous motor could be operated with low torque ripple over a wide range of operating frequencies.

Obviously, many modifications and variations of this invention are possible in light of the teachings of this invention. It is therefore to be understood that within the scope of the appended claims, this invention may be practiced otherwise than as specifically described herein.

What is claimed as new and desired to be secured by Letters Patent of the United States is:

1. A controlling device for a brushless motor comprising:
   a synchronous motor having a rotor;
   a power source and a plurality of unit converting devices which are coupled to the synchronous motor;
   means for detecting the rotor position of said synchronous motor and for outputting phase-shifted position signals with respect to the rotation of the synchronous motor, with each one of said outputted phase-shifted position signals being spaced at a pre-determined phase from another one of said outputted phase-shifted position signals;
   means for controlling the phase of each of said unit converting devices in response to each of said phase-shifted position signals wherein each of said unit converting devices generates a 3-phase alternating current output;
   a plurality of isolation transformers mounted between each unit converting device and said motor; and
   combining means for combining the output of each said isolation transformers whereby 3-phase alternating current outputs from each of the unit converting devices shifted at said pre-determined phase are synthesized producing a sine wave approximate staircase current which is supplied to said motor.

2. A controlling device for a brushless motor as recited in claim 1, wherein:

each of said plurality of unit converting devices comprises an inverting circuit.

3. A controlling device for a brushless motor as recited in claim 1, wherein:
said detecting means is coupled to the rotor of the synchronous motor.

4. A controlling device for a brushless motor as recited in claim 1, wherein:
said detecting means is coupled to the electrical input of the synchronous motor.

* * * * *

UNITED STATES PATENT AND TRADEMARK OFFICE
CERTIFICATE OF CORRECTION

PATENT NO. : 4,496,893

DATED : January 29, 1985

INVENTOR(S) : Teruo Nakano et al

It is certified that error appears in the above-identified patent and that said Letters Patent is hereby corrected as shown below:

On the title page, item (30) should read
-- [30] FOREIGN/PCT APPLICATIONS-JAPAN  83467/79  07/03/79 --

Signed and Sealed this

Seventeenth Day of September 1985

[SEAL]

Attest:

DONALD J. QUIGG

Attesting Officer

Commissioner of Patents and
Trademarks—Designate